US009952739B2

(12) United States Patent
Milne et al.

(10) Patent No.: US 9,952,739 B2
(45) Date of Patent: Apr. 24, 2018

(54) MODULAR AUDIO CONTROL SURFACE

(71) Applicant: AVID TECHNOLOGY, INC., Burlington, MA (US)

(72) Inventors: Steven H. Milne, Palo Alto, CA (US); Martin Kloiber, Portola Valley, CA (US); Paul A. Vercellotti, Albany, CA (US); David M. Tremblay, Boulder, CO (US); Edward Jones, Boulder Creek, CA (US); Robert Boyer, Los Gatos, CA (US)

(73) Assignee: Avid Technology, Inc., Burlington, MA (US)

( * ) Notice: Subject to any disclaimer, the term of this patent is extended or adjusted under 35 U.S.C. 154(b) by 482 days.

(21) Appl. No.: 13/908,052

(22) Filed: Jun. 3, 2013

(65) Prior Publication Data
US 2014/0277647 A1 Sep. 18, 2014

Related U.S. Application Data

(63) Continuation of application No. 13/836,456, filed on Mar. 15, 2013.

(51) Int. Cl.
*G06F 17/30* (2006.01)
*G06F 3/048* (2013.01)
(Continued)

(52) U.S. Cl.
CPC .............. *G06F 3/048* (2013.01); *G06F 3/162* (2013.01); *G06F 3/165* (2013.01); *G06F 17/30778* (2013.01); *G06T 11/206* (2013.01)

(58) Field of Classification Search
CPC .... G06F 1/1632; G06F 3/048; G06F 3/04847; G06F 3/0488; G06F 3/04886;
(Continued)

(56) References Cited

U.S. PATENT DOCUMENTS 7,551,744 B1 6/2009 Loftis et al.
2004/0030425 A1* 2/2004 Yeakel et al. ................... 700/94
(Continued)

OTHER PUBLICATIONS

Guitar Center at NAMM, "Guitar Center at NAMM—Slate Audio Raven" Published on Jan. 26, 2013; Recorded on Jan. 24-27, 2013 Video URL: http://youtu.be/IQ6-PMPvlxk.*
(Continued)

*Primary Examiner* — Duc Nguyen
*Assistant Examiner* — Alexander Eljaiek
(74) *Attorney, Agent, or Firm* — Oliver Strimpel

(57) ABSTRACT

A user-configurable modular audio control surface comprises master modules for controlling global surface properties and channel modules for controlling one or more individual audio channels. The modules are disposed in a two-dimensional spatial arrangement such that any module can occupy a location within the control surface not occupied by another module. The modules are connected to each other and to external platforms hosting media applications and plug-ins via a network. Control surface users can interact with external applications via remote graphical user interfaces displayed on modules within the surface, and can automate multiple external applications using an automation system built into the surface. Automation line graphs and metadata for both internal and external applications are displayed over the corresponding waveform displays that can include audio ahead of a current playback location.

14 Claims, 18 Drawing Sheets

(51) Int. Cl.
*G06F 3/16* (2006.01)
*G06T 11/20* (2006.01)

(58) Field of Classification Search
CPC .... G06F 3/162; G06F 3/165; G06F 17/30778; G06T 11/20; G10H 1/0008; H04H 60/04
USPC ......... 84/622, 625, 634, 636, 723, 725, 730, 84/746; 345/102, 173, 174, 184, 440.1, 345/501, 690, 82; 381/103, 104, 107, 381/109, 119, 120, 122, 123, 150, 160, 381/17, 18, 2, 22, 23, 300, 303, 340, 56, 381/58, 59, 61, 63, 73.1, 77, 92, 94.1, 98; 700/94; 715/716, 732, 733, 810
See application file for complete search history.

(56) References Cited

U.S. PATENT DOCUMENTS

| | | | |
|---|---|---|---|
| 2005/0286213 A1* | 12/2005 | Rooney | 361/679 |
| 2006/0022956 A1* | 2/2006 | Lengeling et al. | 345/173 |
| 2007/0052687 A1* | 3/2007 | Terada | 345/173 |
| 2008/0307442 A1* | 12/2008 | Lim et al. | 719/321 |
| 2010/0119084 A1* | 5/2010 | Mussel | H04H 60/04 381/119 |
| 2011/0188260 A1* | 8/2011 | Ayres | 362/551 |
| 2012/0284622 A1* | 11/2012 | Avery et al. | 715/719 |
| 2013/0060364 A1* | 3/2013 | Kamihara et al. | 700/94 |
| 2013/0219336 A1* | 8/2013 | Klepper et al. | 715/810 |
| 2014/0112499 A1* | 4/2014 | Lintz et al. | 381/119 |

OTHER PUBLICATIONS

HarmonyCentral, "Winter NAMM 2013 Slate Pro Audio Raven MTI" Published on Jan. 27, 2013; Recorded on Jan. 24-27, 2013 Video URL: http://youtu.be/oCfs7jLHlto.*
HarmonyCentral, "Slate Pro Audio Raven MTX multi-touch DAW controller" Published on Nov. 3, 2012; Recorded on Oct. 26-29, 2012 Video URL: http://youtu.be/GY5NiBpasj4.*
STLAudio, "Slate Pro Audio—Raven MTI" Published on Jan. 26, 2013 Video URL: http://youtu.be/6hflfp4VLcc.*
From the editors of Pro Sound News & Pro Audio Review, "The AES Daily: Day 1—Saturday Edition" Oct. 26-29, 2012, The 133rd AES Convention, p. 3 http://www.aes.org/events/133/daily/AES133_Daily_Day1.pdf*
Harrison Console TFT Meter Bridge with ESP Waveforms, http://web.archive.org/web/20110522022456/http://www.harrisonconsoles.com/joomla/index.php?option=com_content&task=view, Harrison, 2011, 4 pages.
Harrison Motion Picture Console, Product Brochures, Harrison, 2011, 8 pages.
Steinberg CMC Series USB Controller, Operation Manaual, Yamaha Corporation, 2011, pp. 1-43.
Milne, et al., EuCon: An Object-Oriented Protocol for Connecting Control Surfaces to Software Applications, AES 121st Convention, San Francisco, CA, Oct. 5-8, 2006, pp. 1-11.
Neyrinck V-Control Pro Product Overview, 2011, 4 pages.
Avid S5 Surface, Installation Manual, Avid, Aug. 2010, pp. 1-9.
Avid Artist Control User Guide, EuControl v.2.6, Avid, 2011 pp. 1-55.
Fairlight Xynergi Xe6 Product Brochure, Fairlight, 2009, 6 pages.

* cited by examiner

FIG. 2

| | | | | | | | |
|---|---|---|---|---|---|---|---|
| | | | CDM | | | MTM | MAM |
| | | | | | MTM | | CFM |
| | | CDM | CDM | CKM | CKM | CPM | CFM |
| | | | CKM | | | CPM | CFM |
| | | | | | CPM | CFM | |
| | CKM | | CKM | CPM | CFM | | |
| CKM | CKM | CPM | CFM | | | | |

202 → CDM
204 → MTM
206 → MAM
208 → CDM
210 → CKM
214 → CPM
212 → CFM

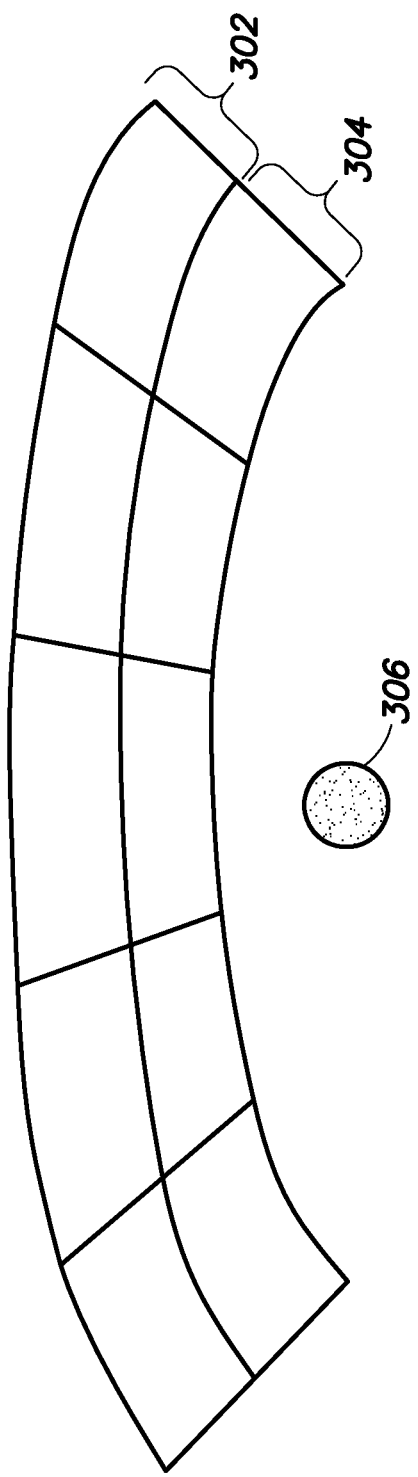

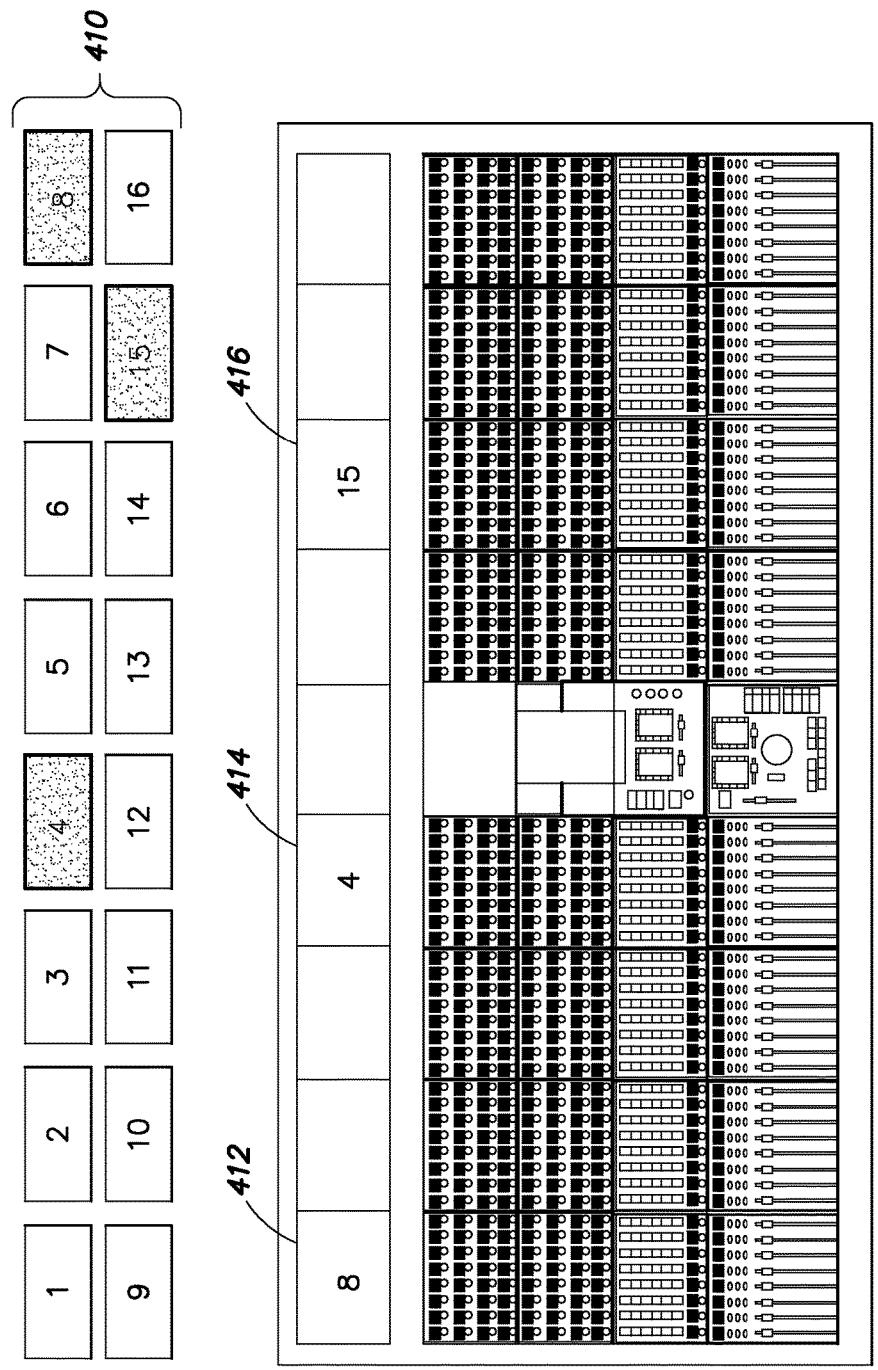

MODULAR AUDIO CONTROL SURFACE

CROSS REFERENCE TO RELATED APPLICATIONS

This application claims priority to and the benefit of, under 35 U.S.C. § 120, and is a continuation of pending U.S. application Ser. No. 13/836,456, filed Mar. 15, 2013, which is incorporated herein by reference.

BACKGROUND

In both live and offline audio editing environments, an audio control surface is a key item, since it provides the principal means by which operators can control the mixing of the various audio sources. As the number of input channels and range of audio processing functions increases, the size and cost of the control surface that is needed increases. The number of channels in various deployed systems varies widely, from only a handful in a hobbyist recording, to well over a hundred in a large live concert. In addition, the types of audio processing to be mixed into a final audio mix depend on the musical setting as well as on the nature of the user. Thus the type and number of audio processing effects required may vary, from a handful of basic processing controls (e.g., EQ, compressor/limiter, expander, etc.) to dozens of sophisticated digital signal processing effects, such reverberation, delay, pitch correction, distortion, and modulation. This means that control surface requirements can vary by well over an order of magnitude between different users and applications. Over time, a particular user may evolve from initially handling relatively small, simple mixes to requiring larger more elaborate ones. Such an evolution would preferably be accompanied by a corresponding increase in the scale and processing capacity of the user's control surface.

Control surfaces represent a significant component of the capital cost of an audio production studio, whether for an amateur, prosumer, or professional. As such, it is desirable for each user to equip themselves with a control surface that is sufficient for, but not surplus to their needs, so that resources are not tied up in unused capacity.

Existing market solutions address various tiers of user requirements, each solution targeted to one of a handful of different user or application categories. In most cases, when a user's requirements change significantly, it is necessary to migrate to a different system entirely, possibly with a different user interface, with an associated disruption and cost. There is therefore a need to address audio mixing needs in a manner that is responsive to changing user requirements.

SUMMARY

In general, an audio control surface commensurate with a user's needs is configured from a range of standardized modules mounted in a frame and connected to each other and to other audio processing devices, such as a digital audio workstation, by a network. Modules include those that provide traditional console controls, such as knobs, faders, touch surfaces, and displays, as well as those that provide expanded and novel functionality. The control surface may simultaneously control the automation of parameters of multiple externally hosted media applications. Graphical user interfaces of external media application plug-ins may be displayed on displays within the control surface. The control surface may receive and display various kinds of data from external media applications, including an audio waveform, an automation line graph, and metadata pertaining to audio tracks. Such data may be received and displayed in advance of real-time, i.e., in advance of a current playback time.

In general, in one aspect, an audio control surface comprises a plurality of modules, wherein each module comprises at least one of user controls for controlling properties of one or more media processing applications and an output display for displaying one or more properties of the media processing applications, wherein the plurality of modules are disposed in a two-dimensional spatial arrangement, and wherein each of the modules is adapted to occupy one of a set of available locations within the control surface not occupied by another module, and wherein each module includes a CPU, random access memory, and a network interface that connects the module to a network.

Various embodiments include one or more of the following features. At least a part of the spatial arrangement conforms to a two-dimensional rectangular grid. At least a part of the spatial arrangement comprises modules disposed along a curved grid. A given one of the modules includes a touch screen, and the user controls of the given module comprise a set of virtual controls implemented on the touch screen. One of the modules comprises a touchscreen interface configured with an expandable touch control for controlling a given functional category, and expanding the touch control with a user-input touch gesture causes a set of virtual touch controls to be displayed, wherein each of the set of virtual controls is assigned to a function related to the given functional category. A user is able to specify a spatial location for a given one of the plurality of modules within the two-dimensional arrangement of modules by: on a display of a designated module of the control surface, positioning a graphical representation of the given module on a two-dimensional graphical representation of the control surface in accordance with the location of the given module within control surface; and in response to a request output by the designated module, adjusting a control on the given one of the control surface modules, thereby causing it to output information that identifies it to the designated module, and wherein the designated module associates the identifying information of the given module with its spatial location. A given control of the control surface is assigned to control functionality provided by one of a plurality of media applications, and each of the plurality of media applications is hosted by a different computer-based platform connected to the audio control surface via the network. A user interface of a plug-in operating with a media application hosted on a platform external to the control surface and in communication with the audio control surface via the network is displayed on a display of a designated module of the control surface. One or more physical controls in physical proximity to the display of the designated module are assigned to control functions of the plug-in. The audio control surface receives a graphical audio waveform representation of an audio track from a media application external to the audio control surface and in communication with the audio control surface via the network, and displays the graphical audio waveform on a display of a designated module of the control surface. During playing of the audio track by the media application, the audio control surface receives the graphical audio waveform representation of the audio track corresponding to temporal locations in the audio track in advance of a current playback temporal location in the audio track, and the audio control surface displays the graphical audio waveform corresponding to temporal locations before and after the current playback time of the audio track. The audio control surface receives automation information from the media application and displays a graphical representation of the automation on the display of the designated module of the control surface such that the displayed automation information is temporally aligned with the displayed graphical audio waveform representation of the audio track. The audio control surface receives metadata pertaining to a clip of an audio track that is represented by the graphical audio waveform, and the audio control surface displays the metadata in association with the graphical audio waveform. During playback of the clip, the metadata pertaining to the clip is received by the audio control surface in advance of a current playback time of the clip, and the audio control surface displays the graphical representation of the waveform and its metadata for a temporal interval spanning times before and after the current playback time of the clip. The control surface receives automation information from a media application hosted on a platform external to the control surface, and displays a graphical representation of the automation on the display of a designated module of the control surface. The automation information pertains to an audio clip, and wherein during playback of the clip by the media application, the graphical representation of the automation information spans temporal locations within the clip before and after a current playback time. The control surface receives metadata pertaining to a clip of an audio track from a media application hosted on a platform external to the control surface, and displays at least one of a graphical and textual representation of the metadata. During playback of the clip by the media application, the displayed representation of the metadata pertains to temporal locations within the clip spanning a current playback time. The audio control surface includes an internal automation system capable of automating one or more media applications hosted on a platform external to the audio control surface. A user is able to record and play back automation of a selected function of one of the plurality of media applications, wherein the selected function is assigned to a control of one of the modules of the audio control surface.

In general, in another aspect, a module includes: a CPU; a random access memory connected to the CPU; a network interface for connecting the module to a network; user controls for controlling properties of one or more media processing applications and/or an output display for displaying one or more properties of the media processing applications; wherein the module is insertable into an audio control surface at any one of a plurality of physical locations within the control surface, and the plurality of physical locations are disposed in a two-dimensional arrangement.

Various embodiments include one or more of the following features. The two-dimensional arrangement includes at least one of a rectangular grid, a curved grid, and an irregular two-dimensional arrangement. The module is adapted to: receive via the network interface audio track data from a media processing application hosted on a platform external to the audio control surface during playback of the audio track by the media processing application; and output a representation of the audio track data on the display, wherein the output is based at least in part on a current playback location of the audio track by the media processing application.

In general, in a further aspect, a control surface module includes: a CPU; a random access memory connected to the CPU; a network interface for connecting the module to a network; user controls for controlling properties of one or more media processing applications; an output display for displaying one or more properties of the media processing applications; wherein the module is insertable into an audio control surface at any one of a plurality of physical locations within the control surface, and wherein the module is adapted to: receive via the network interface audio track data from a media processing application hosted on a platform external to the audio control surface during playback of the audio track by the media processing application; and output a representation of the audio track data on the display, wherein the output is based at least in part on a current playback location of the audio track by the media processing application.

In general, in an additional aspect, an audio control surface includes user controls for controlling properties of one or more media processing applications hosted on one or more platforms external to the audio control surface and an output display for displaying one or more properties of the media processing applications. The audio control surface receives information from the one or more media applications which it displays on the output display. During playback of one or more audio tracks by one of the media processing applications, information pertaining to the audio tracks is displayed in a manner that is based at least in part on a current playback time of the audio tracks. The displayed information includes one or more of an automation line graph pertaining to a parameter that is automated on one of the media processing applications; an audio waveform corresponding to an audio track being played back; and metadata associated with the audio track. The information is displayed for temporal locations within the audio being played back that span locations before and after a current playback time of the audio.

In general, in still another aspect, an audio control surface comprises: user controls for controlling properties of one or more media processing applications; an output display for displaying one or more properties of the media processing applications; and an internal automation system, wherein the automation system is capable of automating a plurality of media applications hosted on one or more platforms external to the audio control surface.

In general, in another aspect, an audio control surface comprises: user controls for controlling properties of one or more media processing applications; an output display for displaying one or more properties of the media processing applications; and wherein a user interface of a plug-in operating with a media application hosted on a platform external to the control surface and in communication with the audio control surface via a network is displayed on the output display.

BRIEF DESCRIPTION OF THE DRAWINGS

FIG. 2 illustrates a two-dimensional arrangement of modules in a modular control surface.

FIG. 3 illustrates a curved two-dimensional arrangement of modules in a modular control surface.

FIG. 4B illustrates a user interface for identifying physical locations of display modules in a modular control surface.

DETAILED DESCRIPTION

As used herein, a digital audio workstation (DAW) refers to an audio application implemented on a computer, such as a personal computer, mobile device, touch pad, or other device that includes a CPU, memory, display, and input devices. DAW functionality includes, but it not limited to the ability to record and play back more than one channel of audio and mix the channels together. A DAW may be implemented on a dedicated device connected to a control surface that mediates the user interface. DAWs may also include non-linear editing functionality, a user interface displaying a timeline that provides a temporal representation of an audio clip, and the ability to cause audio processing to be performed on an audio signal. Such processing may be performed either by the same platform that hosts the DAW, or another system such as an audio processing engine that may be provisioned with digital signal processors (DSPs).

As used herein, an audio processing engine refers to a system that performs audio signal processing so as to mix audio signals together and apply various audio corrections, enhancements and effects. The mixing function may be implemented on a physically distinct component of the audio processing engine referred to as a mix engine. The audio processing engine may be located within an audio control surface or external to it, for example in a room that is sound-isolated from a recording studio.

As used herein, an audio control surface refers to a human interface device used for controlling media applications, including audio applications such as a DAW, a DAW's various plug-ins, and an audio processing engine. An audio control surface includes user controls, such as faders, knobs and switches, and may also include audio processing, audio input and output hardware, and mixing capabilities. An audio control surface may also be used for controlling certain video applications, such as a non-linear video editing system.

Traditional audio control surfaces include banks of sliders and knobs that are laid out in a configuration determined by the manufacturer. The various sets of controls are hard-wired into the system, typically both in terms of the integration of the physical controls into the control surface body, as well as in terms of the electrical connections behind the surface. Typical control surfaces offer physical control of 8 to 32 channels at a time via banks of faders and knobs. Channel capacity may be expanded by software means, such as by assigning different sets of channels to the available hardware, as described, for example, in U.S. Patent Publication 2010/0266147, entitled "System and Method for Audio Mixing," which is wholly incorporated herein by reference. Physical expansion usually requires extending the length of the control surface by linear expansion, or completely replacing the control surface with a model featuring a larger number of channels.

Figure 1:
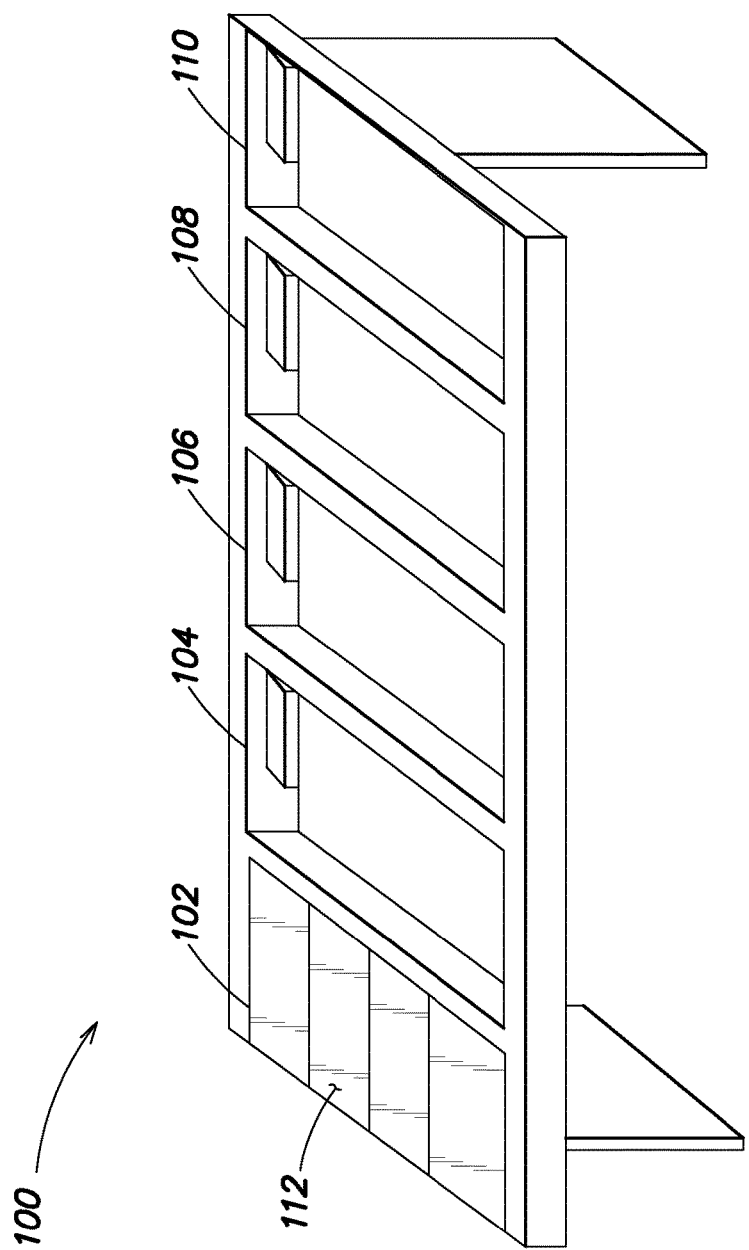
FIG. 1 is a diagram of a frame of a modular control surface.

We describe herein a modular control surface system that addresses the scalability and customizability limitations associated with existing control surfaces. The system enables a control surface to be configured from modules arranged in two dimensions within a frame. The frame houses the modules, providing mechanical support and allowing for the positioning of inserted modules in a desired position, orientation, and height. FIG. 1 is a diagram of an exemplary free-standing frame 100 with legs. The frame defines the perimeter of the control surface, and may include internal subdivisions within which individual modules are placed, such as rectangular buckets 102, 104, 106, 108, 110. In the illustrated framework five rectangular buckets are arranged adjacent to each other in a linear array. One or more modules can be housed within each bucket. Unused spaces may be covered by filler panels 112.

In contrast to control surface systems that scale sideways in increments of 8, 12, or 16 faders, the system described here may be scaled in increments of 8 faders, and may be scaled not only sideways, but also in a vertical manner, up and down what is conventionally termed a channel strip. This facilitates customization to a user's needs since a user does not have to acquire more knobs than necessary if it is only additional faders that are needed, or vice-versa.

A rectangular grid arrangement is illustrated in FIG. 2, in which the various modules of the control surface populate slots in a rectangular two-dimensional arrangement. The modular design enables a particular user to select the modules needed, and add more modules as needed. Frame 202 is sized to accommodate a user's current needs, as well as allow scope for future expansion. Once the length exceeds a certain value, such as a length of eight buckets in a row (as illustrated in the example shown in FIG. 2), a supporting pair of legs are added to the middle of the frame. Desktop frames without legs may also be used. Individual slots may be one of several standard sizes, or custom, configured to accommodate the desired modules. FIG. 2 illustrates a configuration that incorporates master touch module 204, master automation module 206, channel display module 208, channel knob module 210, channel fader module 212, and channel processing module 214.

Each slot is provided with power sockets (e.g., low voltage DC power distributed from a single control surface power supply) and sockets to connect to a standard network, such as Ethernet. The modules connect to each other, to an audio mixing engine, and optionally to other computers and devices via a standard network interface that is included within each of the modules.

The placement of each individual module within the grid may be selected by the user. In general, the layout is chosen to optimize the ergonomics and to conform to existing control surface layout conventions with which the user may be familiar. Since the modules connect with each other via a network interface, and the framework provides standard sizes for accommodating modules, in principle each of the modules can be placed in any location within the frame that is not occupied by another module. In practice, it may be desirable to subdivide the control surface frame and/or buckets into module locations having more than one standard size, so as to facilitate adherence to existing conventional layouts and to accommodate modules that have different sizes. Non-rectilinear geometries for module placement on the surface may also be used, such as an arrangement of modules along an arc around the user. FIG. 3 illustrates a configuration in which the modules are organized along elliptical arcs 302, 304 centered on user 306. Such arcs may be circular, elliptical, or have other curved geometries.

When acquiring a control surface, a user's choice has hitherto been limited to one of a handful of standard surface models, each of which might be either under-specified or over-specified for that user. A common situation that results is that users are forced into acquiring more than they need, which not only gives them an over-large, perhaps overly complicated surface, but also wastes funds. The modular design of the described control surface enables a user to purchase a control surface that matches his needs, and is able to scale up or down as needs change. For example, as the number of input channels being handled increases, it may be advantageous to equip a control surface with a larger set of channel modules. The configuration illustrated in FIG. 2 includes 7 Channel Fader Modules, each of which is able to control 8 channels, thereby allowing for the control of 56 channels without the need to switch input channel assignments. In a situation where, for example, 120 channels are being mixed, more channel modules are added to the surface. These are inserted into empty locations within the existing frame, or accommodated by lengthening the control surface frame to provide more locations to house the modules. The user is able to configure the surface to handle a greater number of channels by adding fader, knob, processing, and display modules in almost any combination.

In addition to the interchangeability facilitated by the standard physical dimensions of the various control surface modules, the modular design is supported by the common network protocol that the modules use to communicate with each other, as well as with external platforms hosting various media applications, such as DAWs, audio input/output devices that incorporate an audio mixer, controls for speaker arrays, such as in public address systems, and video editing applications. The communication is implemented by a network connecting the modules to each other and to external applications. In various embodiments the network is a wired network or a wireless network, or a combination of wired and wireless networks. For example, the network implementing the communication internal to the control surface may of a first type, e.g., wired, and the network connecting the control surface to external media applications may be of a second type, e.g., wireless.

Figure 4A:
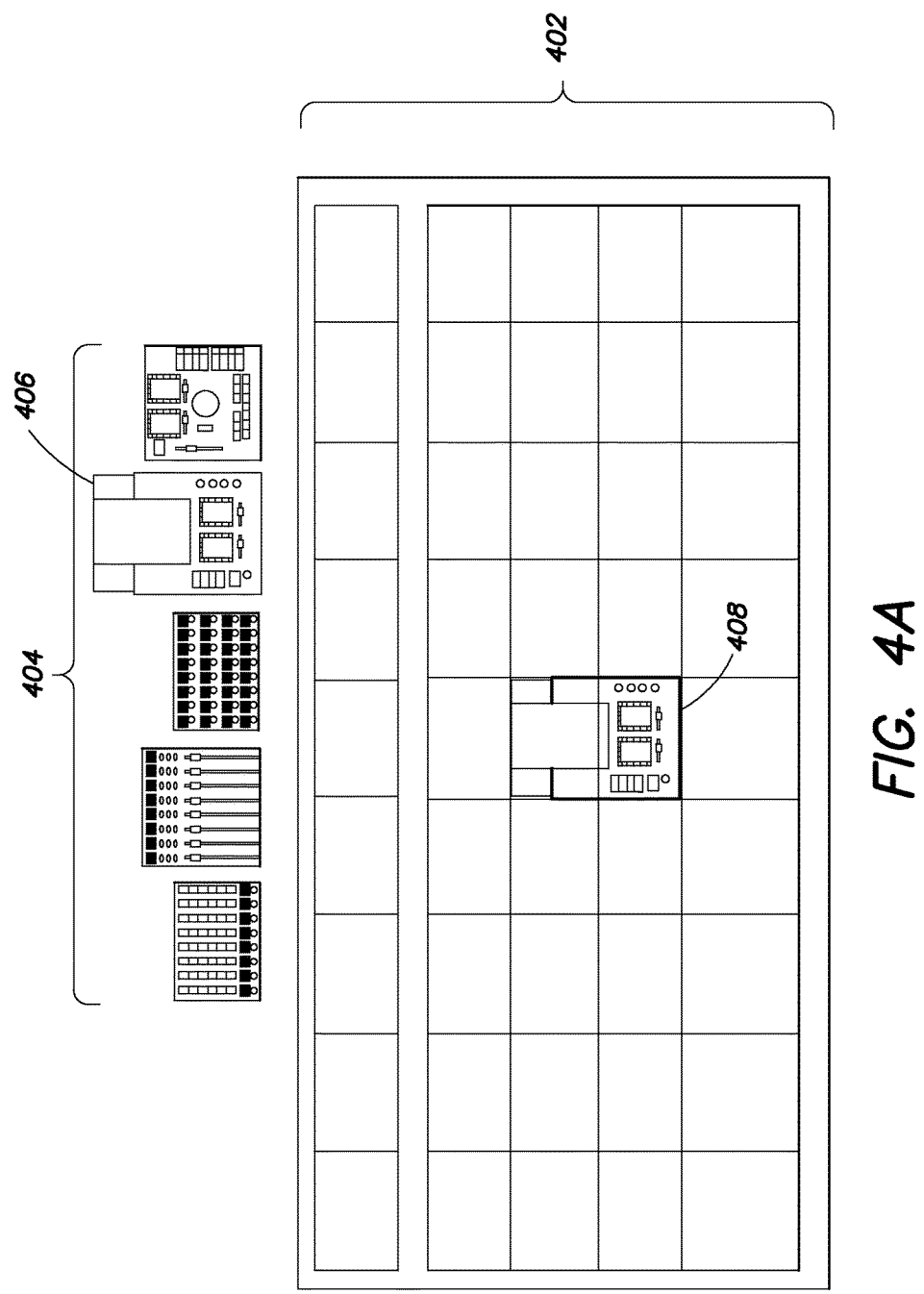
FIG. 4A illustrates a user interface for identifying physical locations of modules in a modular control surface.

When initially populating a modular control surface with modules, or when adding, removing, or rearranging modules, a module configuration program is run on a master module of the surface, such as the master touch module, or on an external computer. In some embodiments the configuration program runs on a platform external to the control surface. The program enables the user to create a diagrammatic picture of the current module layout on the module display. An exemplary user interface is illustrated in FIGS. 4A and 4B. The user initially specifies the number of module rows (or arcs in a curved geometry) and columns (or radial divisions) on the control surface, and the configuration program draws grid 402 with the specified number of rows and columns, as shown in FIG. 4A. The program displays menu 404, which shows icons of available control surface modules, such as master touch module icon 406. The user populates the diagrammatic representation of the physical control surface by selecting icons that correspond to the physical modules present in the control surface from menu 404, and placing them into the locations in diagrammatic representation 402 that correspond to their physical locations in the surface. For example, as shown in FIG. 4A, the user places master touch module icon 408 into the central column of grid 402 to indicate a physical master touch module located in the central bucket of the physical control surface in the second location from the bottom. Each of the module icons placed into the diagrammatic representation is then highlighted in turn, and the user is invited to touch a control on the physical module corresponding to the highlighted module icon. In response, the module then sends identification information, such as its MAC address, over the network, thus tying its location to its address, and making this available to the control surface modules and external platforms on the network. For modules that have no input controls, such as a channel display module, each of the physical channel display modules displays a unique identifier, e.g., a number that uniquely identifies it to the control surface master module, e.g., a designated master touch module. At the same time, a set of channel display module icons showing each of the same unique identifiers is displayed by the module configuration program, as shown in FIG. 4B, 410. The user then identifies the physical locations of the channel display modules to the system by selecting the icons that have the identifiers corresponding to those displayed on the physical modules (e.g., 8, 4, 15), and dragging the icons to the locations in the diagrammatic representation corresponding to each of their respective physical locations (e.g., locations 412, 414, and 416).

Master modules are used to control global properties of the control surface, such as applying a control to all of the channels being mixed, as well as selectable individual channels. Touch and physical controls may be assigned super-channel functionality, channel scrolling, layouts, tracks, monitoring, automation, and metering functions. A master touch module illustrated diagrammatically in FIG. 5, comprises two main parts. An upper part comprises a large (e.g., 12-inch) touchscreen surface 502, which implements a programmable variety of touch controls and information displays for the user. During setup, it is used to control various groups of channels and/or individual channels. A lower part of the master touch module provides various physical controls including, for example, dedicated knobs 504, knobs 506 for monitoring controls, sets of soft keys 508 with associated displays (e.g., LCD) 510 for soft key labels, and a section for control of global system functionality, parameters, and settings. Also provided are various global controls (lower left), comprising such functions as channel settings, channel paging, mute, solo, etc.

The user interface provided on touchscreen 502 includes hierarchical button controls in which certain functions contain a set of related functions. For example, a user may expand box 512 using a touch gesture such as sliding two fingers apart in the vicinity of the box, thereby causing a set of buttons for controlling functions related to the category of functions of box 512 to be displayed. Thus if box 512 controls the category of inserts, expansion brings up a set of effect functions such as modulations, EQ, dynamics, and reverbs. A pinching gesture collapses the inserts back into a single box.

Figure 5:
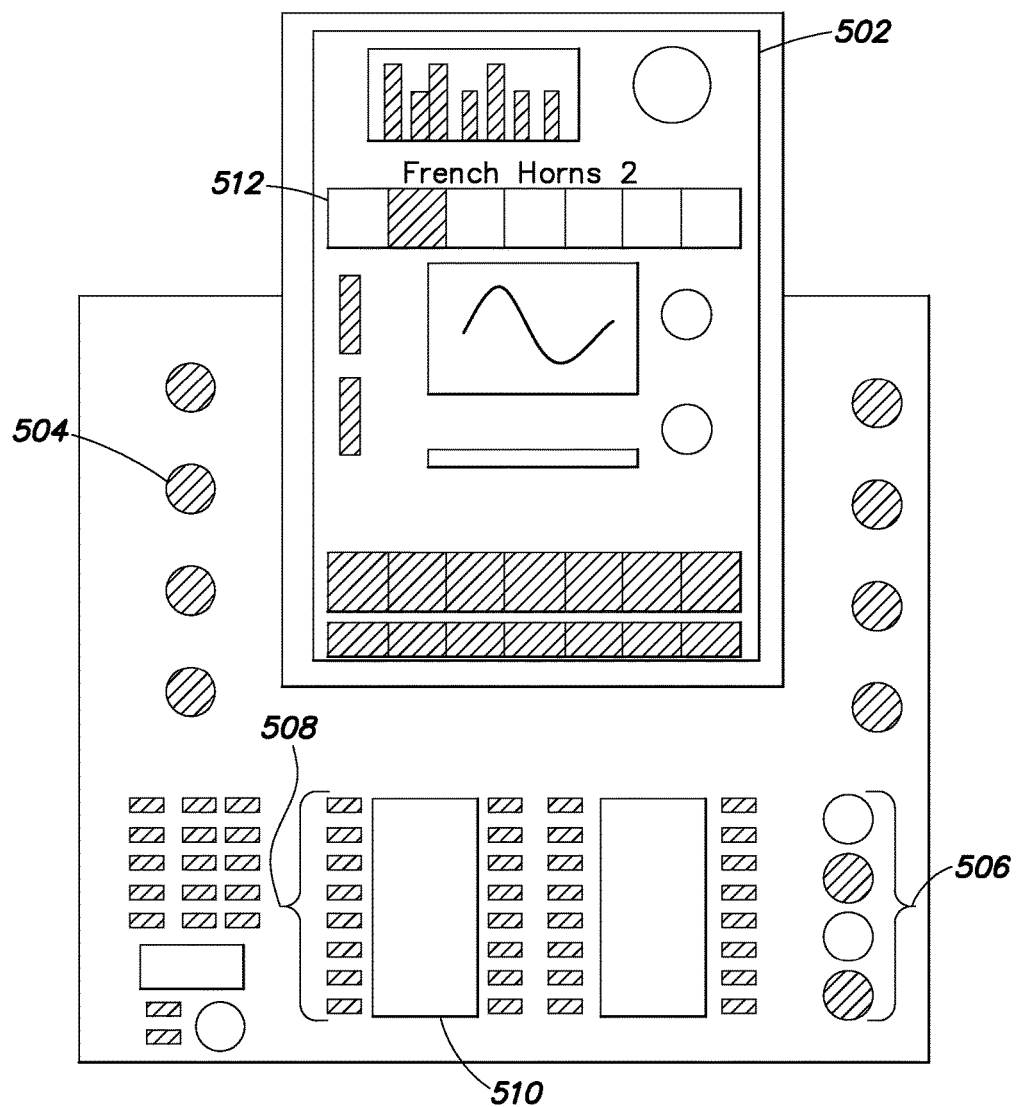
FIG. 5 is a high level diagram of a master touch module of a modular control surface.

In the layout described in FIG. 5, large touchscreen 502 includes a scrollable list of functions, together with a display area for implementing the controls for a user-selected function. In the illustration, the EQ function has been selected for the channel labeled "French Horns 2," using the square-shaped touch buttons (512), and EQ touch controls are displayed in graphical form. A further set of touch controls is provided on large touchscreen 502 to control various user preferences for the control surface such as meters, layouts, tracks, monitoring, automation, snapshots, and scenes.

Figure 6:
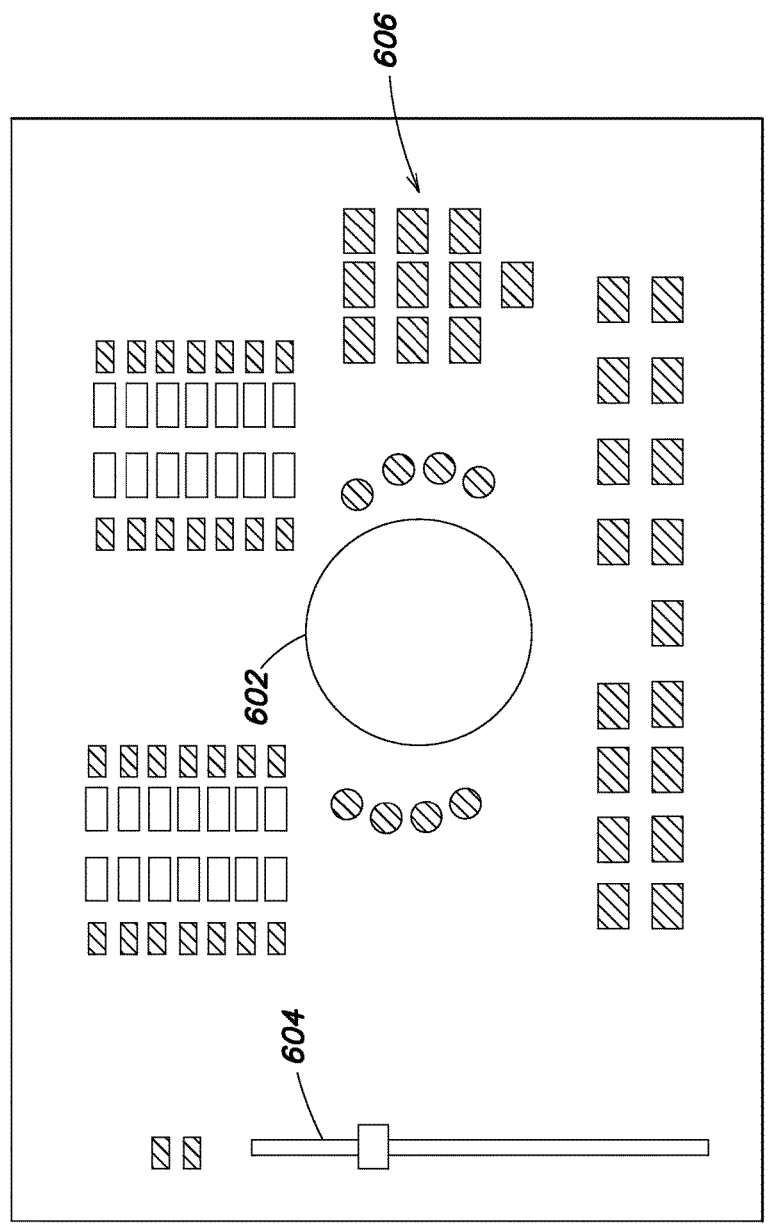
FIG. 6 is a high level diagram of a master automation module of a modular control surface.

A master automation module, such as the example illustrated in FIG. 6, provides transport and automation control, enabling users to control their synchronization system and have dedicated switches for time code and transport-related operations. The module includes shuttle wheel 602, fader 604 that acts either as a master fader or an attention fader, various sets of soft keys, and number keypad section 606 with a dual time code display.

Figure 7:
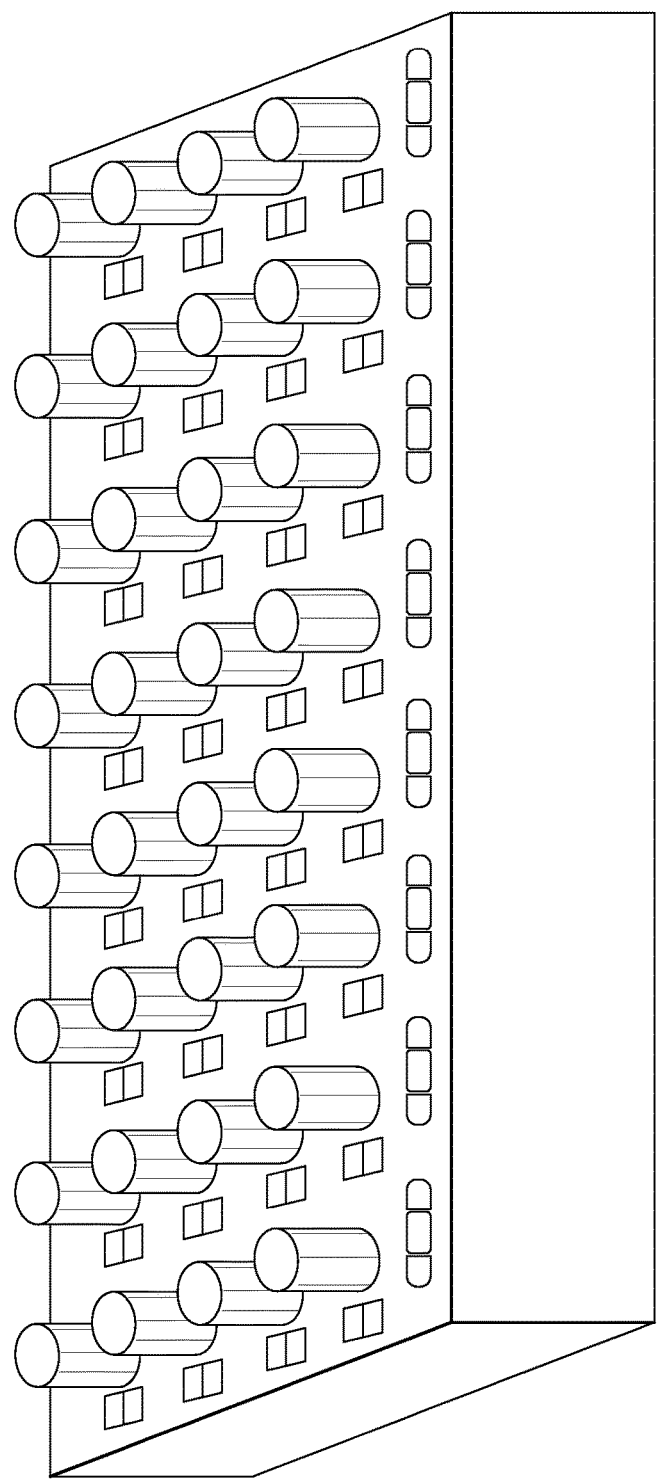
FIG. 7 illustrates a channel knob module of a modular control surface.
Figure 8:
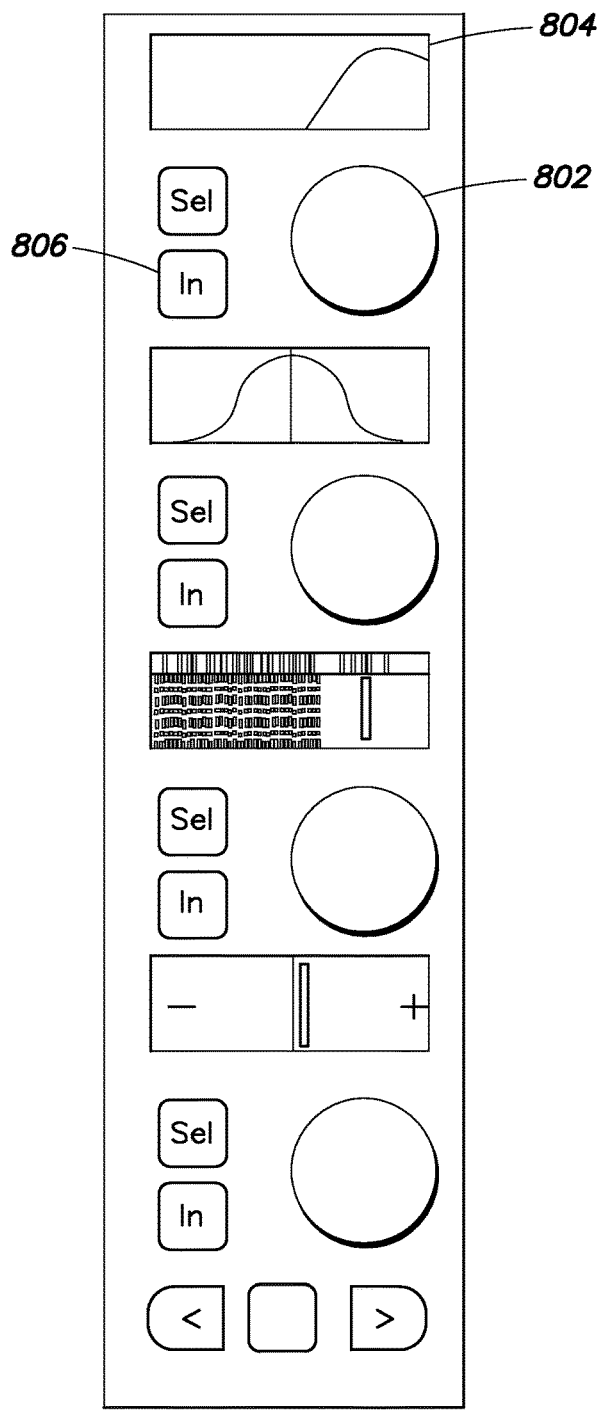
FIG. 8 illustrates a top view of a column of knobs in the module illustrated in FIG. 7.
Figure 9:
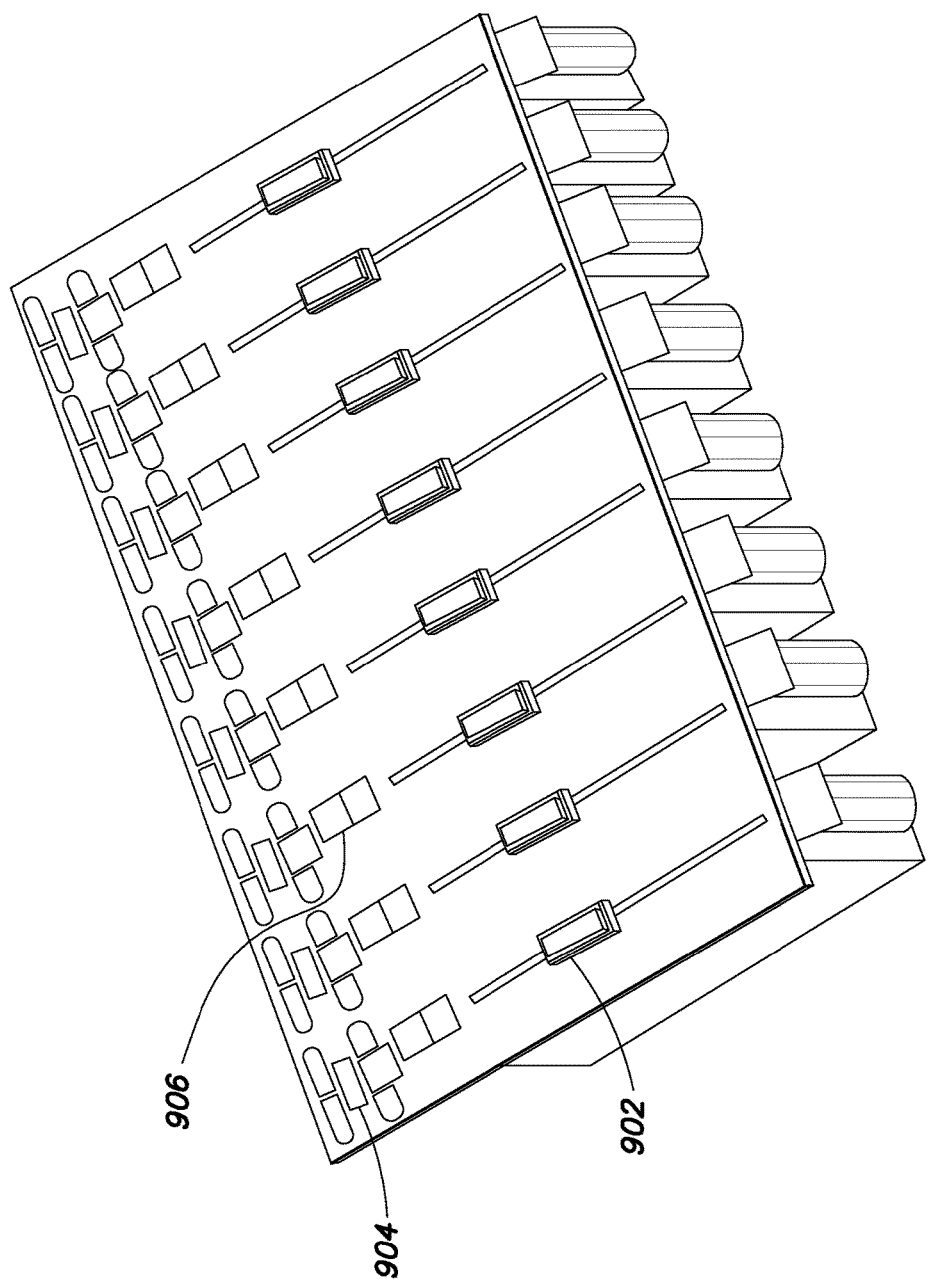
FIG. 9 illustrates a channel fader module of a modular control surface.

Examples of channel module types that make up the described modular control surface include the following. A channel knob module comprises an 8-channel hardware module that is four knobs deep and allows a user to control up to 32 simultaneous knob values for processing on a digital audio workstation or on an audio processing engine. FIG. 7 illustrates such a module, showing knobs with top-lighting to indicate the knob status, and displays, such as LCDs or OLEDs for indicating the knob function and value, as well as automation states. Additional detail of the top panel descriptions in the channel knob module is shown in FIG. 8, which shows a column of four knobs. Knob 802 includes display (e.g., LCD or OLED) 804 for showing parameter values, and select buttons 806. A channel fader module comprises a set of eight motorized faders, allowing users to control up to eight simultaneous DAW tracks or dedicated audio processing engine channels. FIG. 9 illustrates an exemplary channel fader module illustrating both the physical faders (e.g., fader 902) as well displays (e.g., OLED display 904) for showing meters, channel and swap names, automation state, and menu commands, and mute and solo buttons 906).

Figure 10:
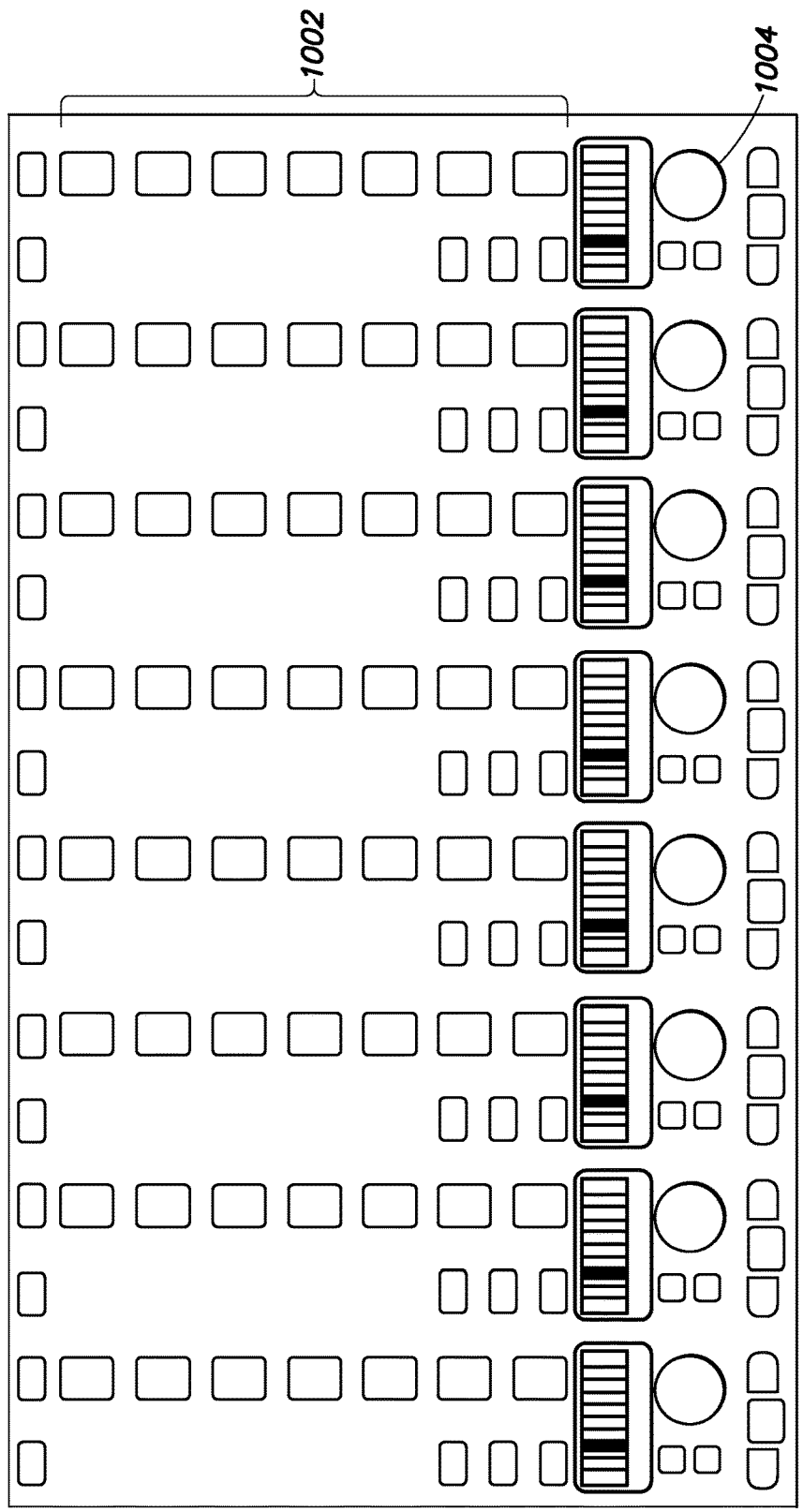
FIG. 10 illustrates a channel processing module of a modular control surface.

A channel processing module comprises an eight-channel hardware module and the function control switches for a channel strip. More specifically, it enables a user to select the functions to be controlled by the knobs of a channel module, such as a channel knob module. An exemplary channel processing module is illustrated in FIG. 10, showing eight sets of function selector buttons 1002. The functions control one knob function per channel, or alternatively up to eight simultaneous knob values for a single channel. For example, in one application, the various values of an EQ for a single selected channel can be distributed across all eight knobs of a channel processing module. The function selector buttons may also be used to select a function for knob 1004, when more than one control for a channel is not available or needed.

Figure 11:
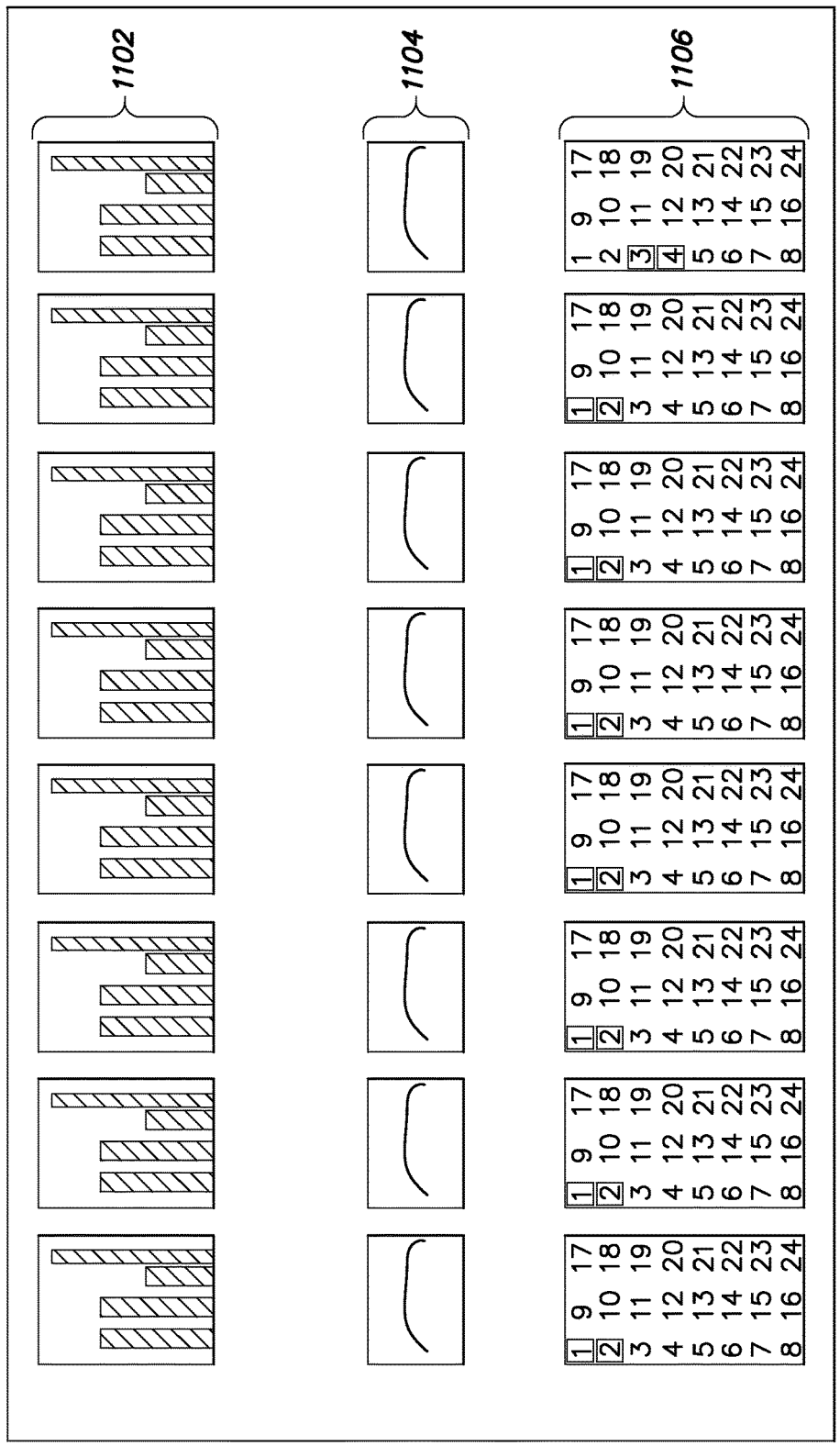
FIG. 11 illustrates a channel display module of a modular control surface.

A channel display module includes a hardware display (e.g., a wide view angle TFT display) for eight channels, enabling users to view audio meters, routing information, function graphs, and other data. In one typical configuration, the channel display module is mounted above other channel modules, forming part of a channel strip. FIG. 11 is a diagrammatic illustration of a channel display module displaying a row of channel audio signal meters for each of eight channels (1102), and a row of line graphs (1104) showing one or more of a number of signal properties, such as an EQ curve, a compression curve, or a pan location. Routing of inputs and outputs are indicated in bottom row 1106, with highlighted numbers indicating the output channels to which each channel is routed.

Users may wish to add functionality, such as audio processing effects, by installing a plug-in on the control surface or on a DAW or mixing engine associated with the control surface. Since a control surface can be quite large, in some cases over 30 feet in length, the separation of a DAW or mix engine display monitor from the control surface virtual and physical controls assigned to the plug-in can be quite considerable. This can result in awkward ergonomics, with the user reaching over to controls at one end of a control surface, while looking at a display at the other end, or even needing to physically move to a new position to be able to manipulate the controls and see the plug-in user interface.

Figure 12:
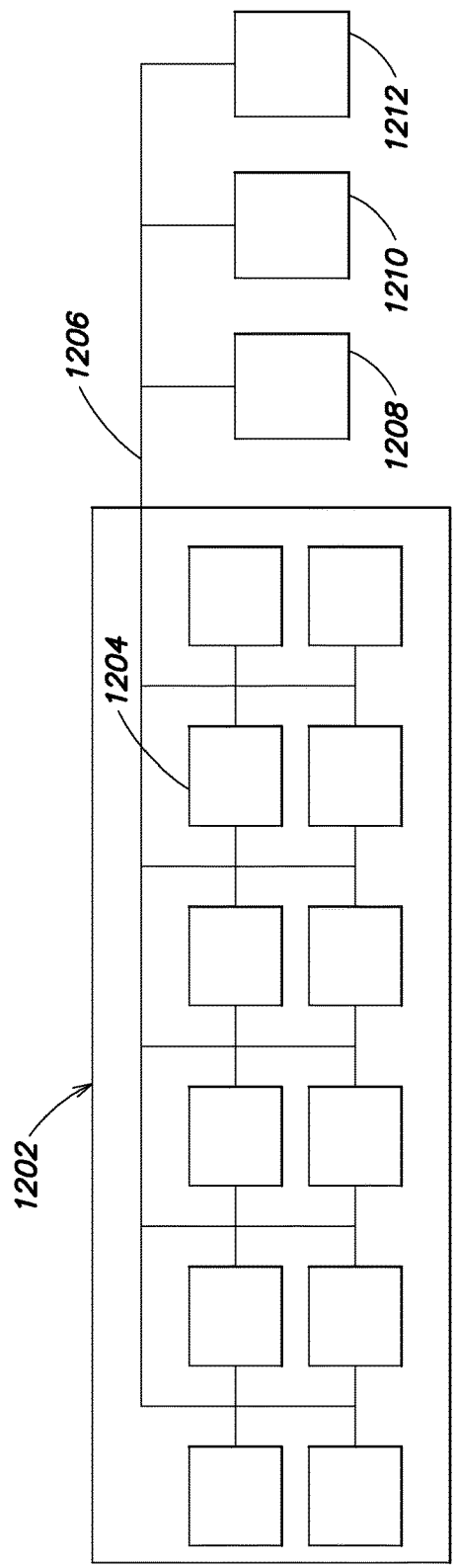
FIG. 12 is a high level block diagram showing data communication pathways among modules of the control surface and between the modular control surface and external media applications.
Figure 13:
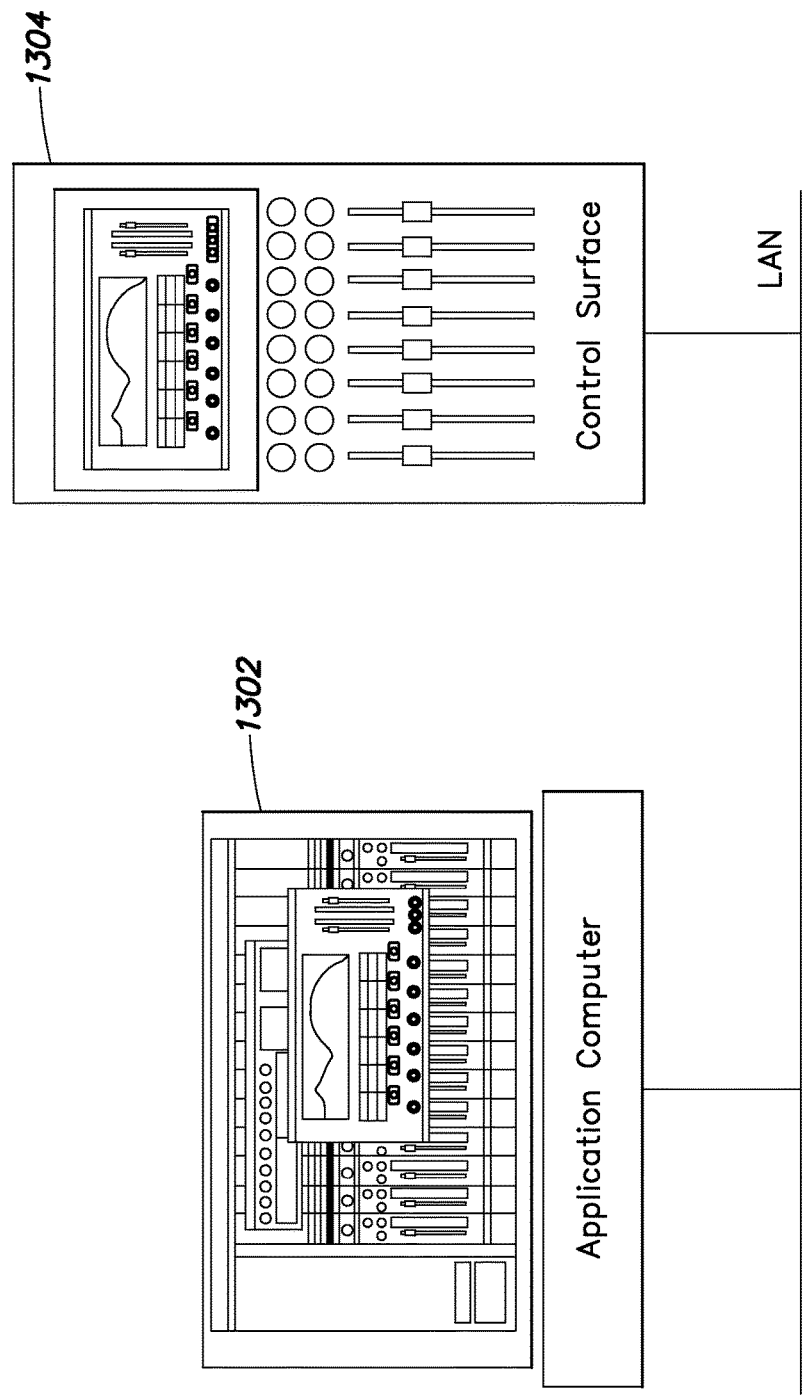
FIG. 13 is a diagram illustrating a display of a graphical user interface of an external media application plug-in on a display of a modular control surface.

In the described modular control surface, the graphical user interface (GUI) of a plug-in is routed to control surface displays that are close to the physical controls assigned to manipulate the plug-in parameters. In effect, both the user input controls and the user-visible output of the plug-in are assigned to a convenient location on the control surface, without regard to the type and location of the platform that is running the application. FIG. 12 illustrates this point, by showing control surface 1202 having multiple modules (e.g., module 1204) all connected via network 1206 using a standard protocol such as Ethernet, to each other and to external platforms, such as DAWs 1208 and 1210, as well as mixing engine 1212. The routing of the plug-in user interface to physical controls and touchscreen controls for input and a display for output is independent of the platform hosting the plug-in, which may be a DAW (1208, 1210) or a mixing engine (1212), even when the external applications and the control surface module are running different operating systems. As shown in FIG. 13, the plug-in GUI may be displayed both on the display of the system hosting the plug-in (1302) as well as on a display within module 1304 of the described modular control surface. As an example of cross-platform compatibility, system 1302 may be running MICROSOFT® WINDOWS® or MAC OS® and control surface module may be running the LINUX operating system. The plug-in GUI may be displayed as a window floating on top of existing information that is being presented on the control surface. In one implementation, the display drawing calls from the external application are intercepted, routed to the control surface and replicated under a new operating system. In another implementation, a cross-platform drawing library is used to draw both on application host 1302 and on control surface module 1304. For plug-ins or other applications with GUIs featuring touch inputs, remoting the interface to the control surface may include routing the display outputs to the control surface display, and assigning the inputs to physical controls in proximity to the control surface display. In a more complete implementation, both the output displays and the touch input controls are remoted to the control surface touchscreen interface. In a further implementation, the GUI bit map that is output to the display of the plug-in host system is routed to the control surface for display as well. This is achieved by reading out the contents of the host system frame buffer, or by intercepting the data as it is being written to the frame buffer, and then sending it to the control surface for display. Control surface modules that are suitable for displaying a plug-in GUI include a channel display module, especially when a plug-in is being applied only to an individual channel, and a master touch module.

The assignment of the various physical controls of a control surface to parameters of the DAWs and other external applications is performed by either or both of pre-assignment by the system and assignment by the user. The assignment may be performed down to a granularity of individual faders, knobs, and switches. Pre-assignment of the functions of the surface controls is established between the control surface and the external media applications by means of an industry standard network protocol. An example of such a protocol is EUCON™, available from Avid® Technology of Burlington, Mass., which supports tagging of external application parameters that enables the surface logic to map those parameters intelligently to suitable surface controls. User assignment of physical controls to a particular application external to the control surface is managed via a user interface hosted by logic within the control surface, for example within a master touch module. Information as to the physical location of each module, and each control within that module, is distributed across all the platforms running the external applications as well as the module hosting the control assignments. The assignment information is also available to other control surface modules, which provides some redundancy in case of failure of a master module or an external platform. At any one time, any given control is controlled by a single application, and it may then be directly controlled from the external application. Once assigned, internal communication based on TCP/IP is used to send control movement messages between each module and the control surface logic. In various implementations, the surface logic is distributed, and control movement messages are broadcast to all the external applications.

Embedding third party graphical content within the control surface displays enables users to experience the full richness of the original plug-in interface, both with respect to plug-in functionality as well as the graphical look and feel and branding of the plug-in. In other words, the system does not require the plug-in functionality to be abridged or simplified when accessed from the control surface rather than from the system hosting the plug-in.

Many audio and video applications can record and play back movements of control parameters that vary with temporal location within a given time-based media component. For example, the volume, EQ, compression, limiter, and stereo pan of an audio track may be adjusted during playback. These adjustments are recorded and time-stamped as they occur. During playback, the application responsible for the adjusted control reproduces the recorded adjustment, enabling play back without the operator having to touch the controls any further. This is called automation, and it can be used for any type of control, including faders, switches (e.g., mute), and knobs.

Automation dramatically improves workflow. Complex musical compositions and soundtracks with hundreds or even thousands of parameter changes can be realized because the sound engineer can work on a few parameters at a time, while an automation system faithfully plays back all the parameter changes.

Figure 14:
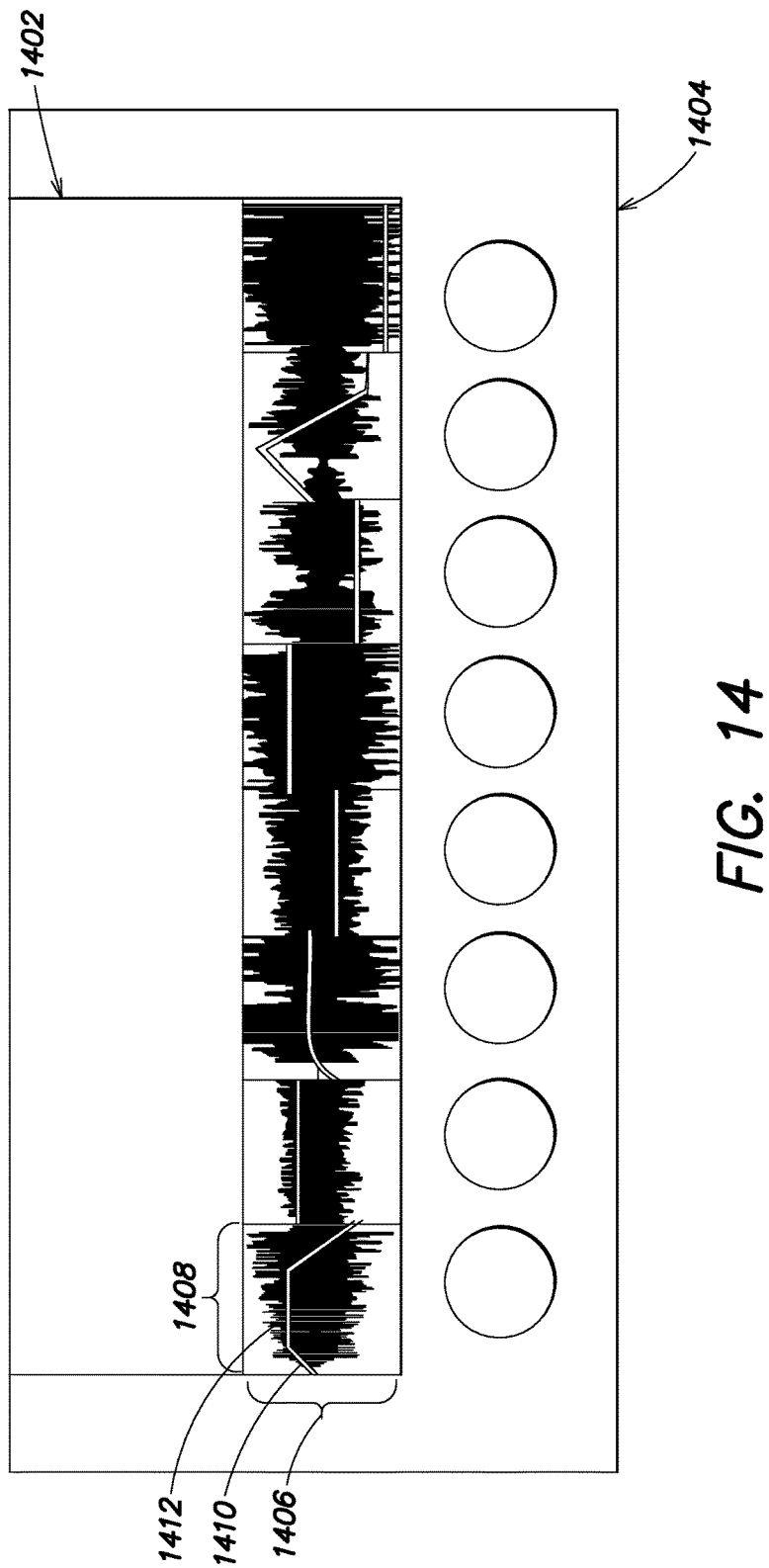
FIG. 14 is diagram illustrating a display within a module of a modular control surface of automation line curves superposed on an audio waveform representation of the corresponding automated audio track.

In order to provide the user with a visual representation of automation settings, a line graph representing the time-varying value of the automated parameter is displayed. For example, in a two-dimensional graph, the horizontal (x) axis may represent time, and the vertical (y) axis represents the value of the parameter. Applications that host automation typically show this line graph on a display of the platform hosting the application. As discussed above, control surfaces for complex mixing tasks are often long, and a user may not be able to view the automation line graph on the display of a DAW hosting the automation while at the same time being positioned in front of the control surface with access to the controls needed. This ergonomic and workflow problem is addressed by embodiments of the described modular control surface that enable an automation line graph from external applications and plug-ins hosted on platforms outside the control surface to be displayed on a monitor within the control surface, such as a master touch module screen or a channel display module screen. The automation line graph may be superimposed over an audio waveform, which helps the user gauge the accuracy of the automation timing, and the nature of the automation curves. FIG. 14 illustrates display 1402 of control surface module 1404, with waveform/automation line graph display area 1406. In the example illustrated in FIG. 14, display area 1406 comprises eight graphs, one for each of eight channels, such as graph 1408. Each graph shows an automation line graph, such as automation line graph 1410, superposed on that channel's audio wave form 1412, which is a visual representation of audio signal amplitude (e.g., in decibels) plotted against time. In the example shown, the automation line graph represents fader gain level in decibels, plotted against time. Other parameters that have been automated may be shown as additional lines on the same graph or on separate graphs. Automation line curves for internally recorded and played back automation may also be displayed, either as another line graph on a graph showing externally driven automation, or on a separate graph.

During mixing of pre-recorded audio, a user may wish to anticipate certain audio events so as to be able to alter the mix before these events are played. For example, when mixing a track from a movie sound track, the user may want to reduce the volume of a loud event such as a door slamming or a gunshot so that it does not overpower other sounds or unduly shock the viewer. To enable anticipatory mixing, upon request from the user, waveform and automation information is sent to the control surface in advance of real time. For a viewable time span of 30 seconds, a typical split would be 10 seconds of past data and 20 seconds of future data. The waveform information is a pre-rendered graphic of the audio sample it represents, i.e., the displayed waveform is pre-generated directly from the audio sample. This contrasts with systems that generate the waveform from a recording of meter values, which produces a less accurate representation.

Figure 15:
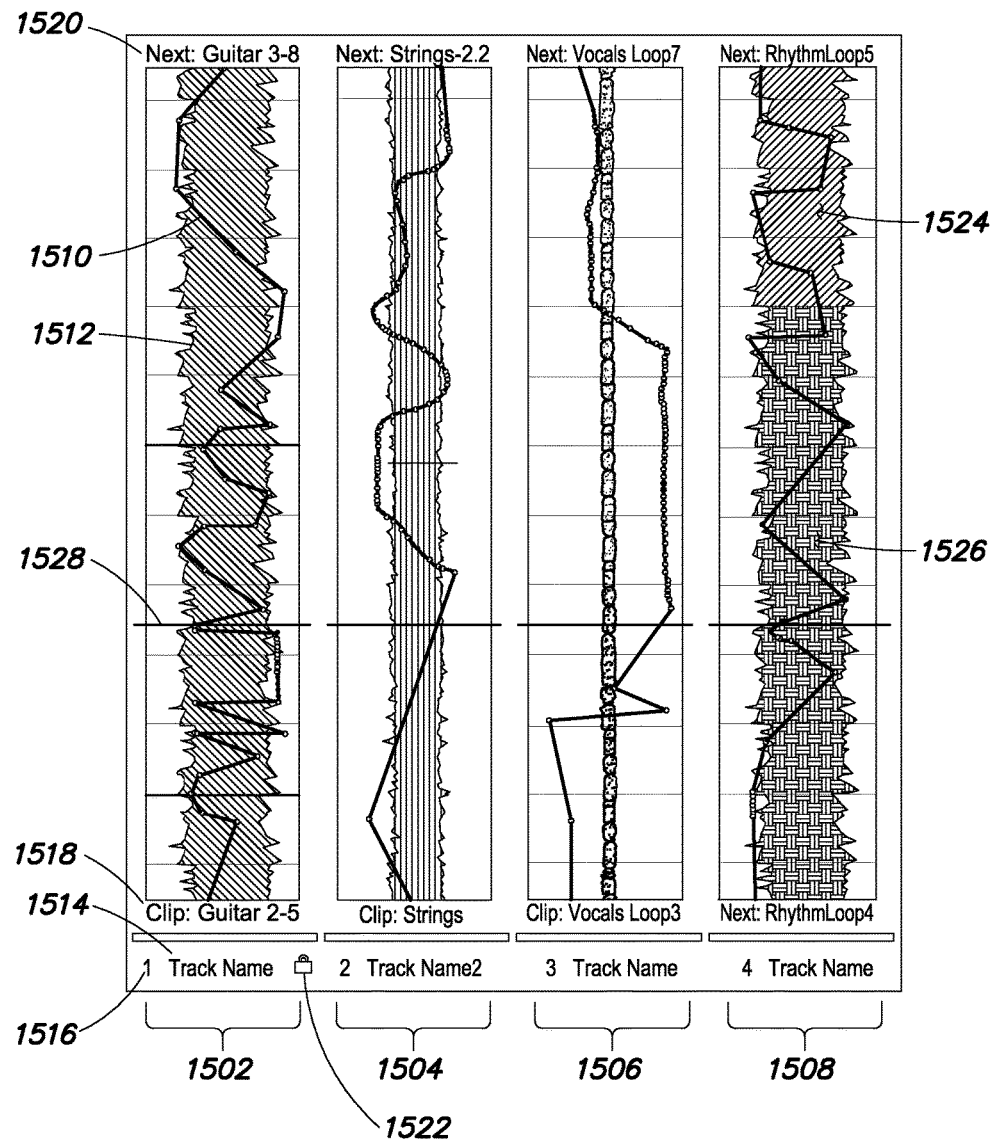
FIG. 15 illustrates a display of a module of a modular control surface showing audio waveforms, automation line curves, and metadata for audio tracks and clips received from an external digital audio workstation.

In addition to receiving waveform and automation information, the surface may also receive metadata from external applications that pertain to the displayed audio signal and its automation. An example of metadata display in association with the automation line graph and the waveform display is shown in FIG. 15. In this example, which involves controlling a DAW, time is plotted vertically in the displayed graphs, with waveform/automation line graphs displayed for each of four audio tracks 1502, 1504, 1506, and 1508. As used herein, the term track refers to an audio track of a DAW, and an audio clip refers to a portion of an audio track, e.g., defined by a temporal range, or may also refer to an entire audio track. Each track is assigned to one or more channels on the control surface. Automation line graph 1510 shows fader volume in decibels, superposed on audio signal waveform 1512, with which it is temporally synchronized. The display includes the following metadata: track name 1514; track number 1516; name of current clip being played 1518 in a particular track; name of the next clip to be played 1520; and indication 1522 as to whether the track is locked to the corresponding physical strip, i.e., the column of controls that may extend across several control surface modules that is assigned to control the track. The displayed portion of track 1508 includes parts of two clips 1524 and 1526, which are distinguished on the display by distinct colors or shading. The display also shows playhead (or Now Line) 1528, corresponding to the current temporal location in the displayed tracks of playback. In the examples mentioned above, a gunshot or a door slam sound may be described as such in the clip name metadata. Other metadata may be tied to a transition sequence, such as a scene change for a movie, e.g., "fade to outdoor scene." Such metadata is sent to the surface to accompany both real-time and advance waveform and automation line graph information. The metadata is displayed in association with the waveform and automation line graph. To summarize: the automation line graph display may include three kinds of information: (1) the automation line graph itself, (2) the audio waveform, and (3) metadata pertaining to the audio; the information originates from either or both of applications running externally to the control surface, such as on DAW plug-ins, and from applications that may be running internally on the control surface. Seamless receipt and display of information from multiple external and internal applications is facilitated by the standard network interface and protocol between the control surface modules and the external applications.

Figure 16:
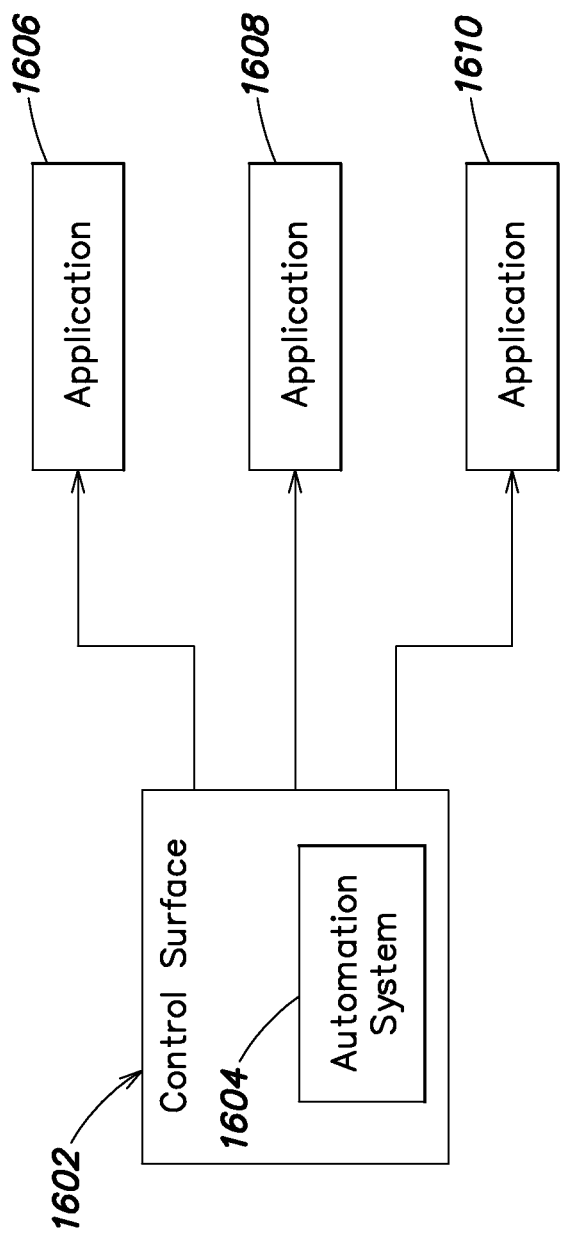
FIG. 16 is a high level process flow diagram illustrating automation of multiple external applications by an automation system within a modular control surface.

In various embodiments and as illustrated in FIG. 16, the described control surface 1602 includes its own automation system 1604 that is able to record and play back automation for multiple applications (1606, 1608, and 1610) simultaneously. For example, the volume on a first track of a DAW application may be controlled by automation for a first fader on the control surface, while a video application parameter such as a video audio track level, color correction, hue saturation parameter, or wipe speed of a transition, may be controlled by automation of a second fader.

Figure 17:
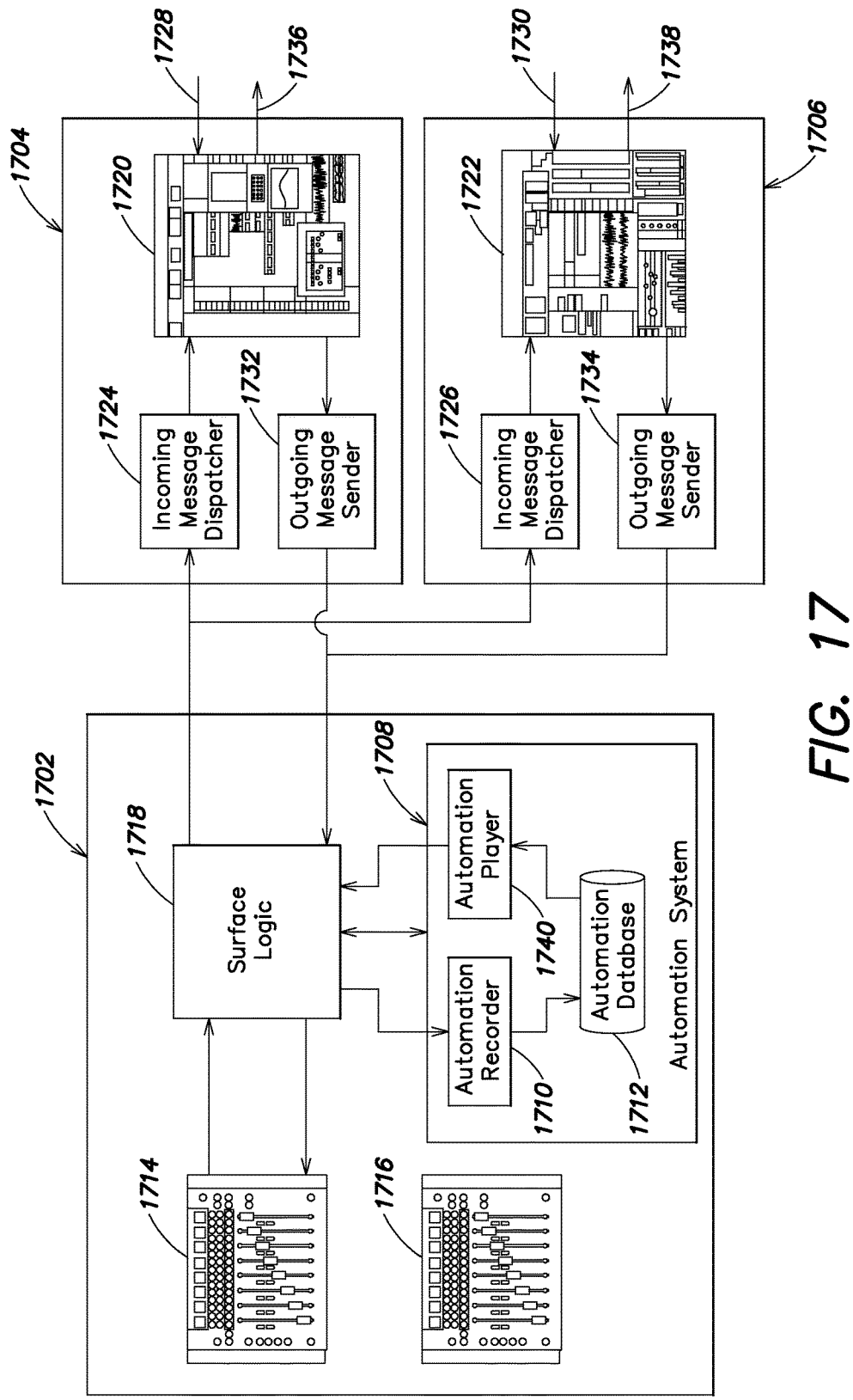
FIG. 17 is a high level process flow diagram showing flow of information during automation of two external applications by an automation system of a modular control surface.

FIG. 17 is a block diagram of control surface 1702 and computers 1704 and 1706 that host media editing and processing applications (such as a DAW or a video editor) showing more details of the automation system (1708) within the control surface, and the manner in which it operates with the other components of the control surface and with the external media applications.

The user enables the recording of automation by pressing an audio play key to start playback, and then initiates the recording of automation of one or more controls by using one of a number of means provided on the control surface, such as toggling a button associated with a control or touching the control. This causes automation recorder 1710 to start recording the changes made by the user to the control, which are then stored in automation database 1712. The user inputs the changes via physical controls 1714 on the surface and/or virtual controls 1716 on a touch screen within one of the control surface modules (e.g., master touch module). The corresponding parameter changes are sent to surface logic 1718, which interprets the raw physical or virtual switch presses and fader moves, converting them into corresponding messages over the network using a communication protocol, such as EUCON. The messages are also routed to automation recorder 1710 for storing in automation database 1712, and sent from the surface to the one or more computers (1704, 1706) each hosting an application (1720, 1722 respectively) assigned to the control that has been adjusted. Examples of commercially available DAWs include PRO TOOLS® from Avid Technology, Inc., LOGIC® from Apple® Computer, Inc. and CUBASE® from Steinberg®. The applications to which the control surface messages are sent could be other types of media applications, including video editing applications such as MEDIA COMPOSER® and FINAL CUT PRO®. Incoming message dispatchers 1724, 1726 receive the messages from surface logic 1718, and forward parameter change callbacks to applications 1720 and 1722. In response, the DAWs apply the parameter changes to audio processing within the DAW, and issue parameter set calls that are routed to outgoing message senders 1732, 1734, and then sent over the network back to the control surface. Applications 1720 and 1722 also move graphical controls (e.g., faders, knobs, etc.) corresponding to the changed parameters on their displays in alignment with the surface controls. In certain circumstances, this position may be different from the physical position last input on the control surface by a user, such as if the user moves the control outside a range supported by the external application. Audio inputs from applications 1720 and 1722 are shown at 1728 and 1730 respectively, and audio outputs are shown at 1736 and 1738 respectively.

To play back the automation, the user starts playback with a predefined action, such pressing the audio play key, which sends a control signal to automation player 1740 to start playback. The player retrieves the recorded automation commands from automation database 1712, and plays them out via the surface logic 1718, which then acts upon controls 1714 and 1716, as well as applications 1720 and 1722. In order to reduce vulnerability to network latency during playback, a block of automation data may be transferred from the surface to the applications in advance of them being required for playback and stored in a local cache, and are then available locally (i.e., with no latency) during playback.

Implementation of the various software components of the described modular control surface may be on a single platform or distributed across more than one platform. For example, surface logic 1718, which is shown as a part of control surface 1702 in FIG. 17, may be implemented on a CPU in the control surface, or on a CPU in a workstation computer hosting a connected DAW, or distributed across both the control surface CPU and the workstation CPU. When data is communicated between modules or between platforms, the standard network protocol, such as ETHERNET is adopted. By contrast, if control surface functions are implemented within a single module of the control surface, communication among these functions may use direct internal message passing, without the use of the external network protocol.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, LCD, plasma displays, OLEDs, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software or hardware or firmware, or a combination of the three. The various elements of the system, either individually or in combination may be implemented as one or more computer program products in which computer program instructions are stored on a non-transitory computer readable medium, for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A media control surface comprising:
a plurality of modules including a display module, the display module comprising:
a network interface that connects the display module to a network;
an output display for displaying properties of one or more media processing applications hosted on one or more platforms external to the media control surface, wherein each of the one or more platforms is in communication with the media control surface via the network; and
an automation system capable of automating the one or more media processing applications, wherein automating a given one of the one or more media processing applications includes:
at the automation system, receiving control parameter adjustments via one or more input controls of the media control surface, wherein the control parameter adjustments are applied to the processing of media data by the given one of the one or more media processing applications;
time stamping and storing the control parameter adjustments in storage of the automation system;
in response to receiving an automation playback command subsequent to the storing of the control parameter adjustments:
causing logic within the automation system to retrieve the stored control parameter adjustments from the storage of the automation system;
sending the stored control parameter adjustments to the one or more platforms external to the media control surface in synchrony with playback of the media data; and
wherein the media control surface:
receives over the network data comprising a temporal location of a plurality of clips of the media data being processed by the given media processing application; and
uses logic of the display module of the media control surface to generate from the retrieved control parameter adjustments an automation line graph and to temporally align the automation line graph with the temporal location of the plurality of clips of the media data being processed by the given media processing application, thereby enabling the logic of the display module to superimpose the automation line graph onto a display of the temporal location of the plurality of clips, wherein the superimposition of the automation line graph onto the display of the temporal location of the plurality of clips is independent of automation data received over the network from the given media processing application.

2. The media control surface of claim 1, wherein a user is able to select a parameter of one of the one or more media processing applications, and following the selection, the automation system is capable of recording and playing back automation of the selected parameter, wherein the selected parameter is assigned to an input control of one of the plurality of modules.

3. The media control surface of claim 1, wherein the display module:
receives from the automation system time-based automation information from a media processing application hosted by the control surface;
receives over the network time-based automation information for one or more of the one or more externally hosted media processing applications; and displays on the output display a graphical representation of the time-based automation information for both the media processing application hosted by the control surface and the one or more externally hosted media processing applications.

4. The media control surface of claim 1, wherein:
a first parameter of a given one of the one or more externally hosted media processing applications is automated by the automation system;
the given one of the one or more externally hosted media processing applications includes a second automation system; and
a second parameter of the given one of the one or more externally hosted media processing applications is automated by the second automation system.

5. The media control surface of claim 4, wherein the display module receives automation information for the first and second parameters, and displays a graphical representation of the automation information for the first and second parameters.

6. The media control surface of claim 1, wherein the media control surface receives over the network a graphical audio waveform representing audio data being processed by one or more of the one or more media processing applications, and displays the graphical audio waveform on the output display.

7. The media control surface of claim 1, wherein the media data being processed by one of the one or more media processing applications corresponds to an audio clip.

8. A media control surface module comprising:
a CPU;
a random access memory connected to the CPU;
a network interface for connecting the module to a network;
a display module including an output display for displaying properties of one or more media processing applications hosted on one or more platforms external to the audio control surface, wherein each of the one or more platforms is in communication with the media control surface via the network; and
an automation system, wherein the automation system is capable of automating the one or more media processing applications, and wherein automating a given one of the media processing applications includes:
at the automation system, receiving control parameter adjustments via one or more input controls of the media control surface, wherein the control parameter adjustments are applied to the processing of media data by the given one of the media processing applications;
time stamping and storing the control parameter adjustments in storage of the automation system; and
in response to receiving an automation playback command subsequent to the storing of the control parameter adjustments:
causing logic within the automation system to retrieve the stored control parameter adjustments from the storage of the automation system;
sending the stored control parameter adjustments to the one or more platforms external to the media control surface in synchrony with playback of the media data; and
wherein the media control surface receives over the network data comprising a temporal location of a plurality of clips of the media data being processed by the given media processing applications, and uses logic of the display module to generate a display of an automation line graph generated from the retrieved control parameter adjustments and to temporally align and superimpose the automation line graph onto a display of the temporal location of the plurality of clips of the media data being processed by the given media processing application, wherein superimposing the automation line graph onto the display of the temporal location of the plurality of clips is independent of automation data received over the network from the given media processing application.

9. The media control surface module of claim 8, wherein during playback of the media data, the display module:
receives data describing the recorded control parameter adjustments; and
displays a graphical representation of the control parameter adjustments.

10. A method of automating one or more media processing applications, the method comprising:
receiving via one or more input controls of a media control surface adjustments of a set of control parameters for controlling media data, wherein the control parameter adjustments apply to parameters of one or more media processing applications hosted on platforms external to the media control surface; and
using an automation system hosted by the media control surface:
time stamping and storing the control parameter adjustments in storage of the automation system; and
in response to receiving an automation playback command subsequent to the storing of the control parameter adjustments:
causing logic within the automation system to retrieve the stored control parameter adjustments from the storage of the automation system;
sending the stored control parameter adjustments to the one or more platforms external to the media control surface in synchrony with playback of the media data; and
wherein the media control surface receives from a given one of the one or more media processing applications data comprising a temporal location of a plurality of clips of the media data being processed by the given media processing application, and uses logic of the media control surface to generate from the retrieved control parameter adjustments an automation line graph and to temporally align the automation line graph with the temporal location of the plurality of clips of the media data being processed by the given media processing application, thereby enabling the media control surface to superimpose the automation line graph onto a display of the temporal location of the plurality of clips independently of automation data received from the given media processing application.

11. The method of claim 10, further comprising during playback of the media data:
receiving data describing the recorded control parameter adjustments; and
displaying a graphical representation of the recorded control parameter adjustments.

12. The method of claim 10, further comprising during playback of the media data:
receiving a graphical audio waveform representing audio data being processed by one of the one or more media processing applications; and
displaying the graphical audio waveform.

13. The method of claim 12, wherein the audio data being processed comprises a clip of an audio track.

14. The method of claim 10, wherein the media data comprises a clip of an audio track.

* * * * *